(12) United States Patent
Benedetti et al.

(10) Patent No.: US 7,513,412 B2
(45) Date of Patent: Apr. 7, 2009

(54) APPARATUS WITH CARTRIDGES FOR THE PREPARATION OF DRINKS, WITH ACTIVATION FOLLOWING THE READING OF AN OPTICAL CODE CARRIED BY THE CARTRIDGE

(75) Inventors: Michele Benedetti, Lippo di Calderara di Reno (IT); Maurizio Bianchi, Bologna (IT); Davide Bottazzi, Bologna (IT)

(73) Assignee: Datalogic S.p.A., Calderera de Reno (Bolgna) (IT)

( * ) Notice: Subject to any disclaimer, the term of this patent is extended or adjusted under 35 U.S.C. 154(b) by 519 days.

(21) Appl. No.: 11/121,750

(22) Filed: May 4, 2005

(65) Prior Publication Data

US 2005/0249052 A1 Nov. 10, 2005

(30) Foreign Application Priority Data

May 4, 2004 (EP) .................................. 04425317

(51) Int. Cl.
*G06F 17/00* (2006.01)
(52) U.S. Cl. .................. 235/375; 235/381; 235/383
(58) Field of Classification Search .............. 235/375, 235/381, 383, 462.01
See application file for complete search history.

(56) References Cited

U.S. PATENT DOCUMENTS

| | | | |
|---|---|---|---|
| 4,858,523 A | 8/1989 | Helbling | |
| 5,191,199 A | 3/1993 | Elko | |
| 5,544,758 A | 8/1996 | Malatesta et al. | |
| 5,913,454 A * | 6/1999 | McHale | 222/2 |
| 5,974,950 A | 11/1999 | King | |
| 6,021,394 A * | 2/2000 | Takahashi | 705/10 |
| 6,117,471 A | 9/2000 | King | |
| 6,751,525 B1 * | 6/2004 | Crisp, III | 700/241 |
| 6,772,944 B2 * | 8/2004 | Brown | 235/376 |
| 2002/0048621 A1 | 4/2002 | Boyd et al. | |
| 2003/0196557 A1 | 10/2003 | Kim et al. | |

FOREIGN PATENT DOCUMENTS

| | | |
|---|---|---|
| EP | 272922 | 12/1987 |
| EP | 334573 | 3/1989 |
| EP | 972481 | 7/1999 |
| EP | 1163869 | 5/2001 |
| WO | WO01/58786 | 2/2001 |
| WO | WO02/28241 | 10/2002 |

OTHER PUBLICATIONS

European Search Report of application EP 04 42 5317 dated Sep. 17, 2004.

* cited by examiner

*Primary Examiner*—Ahshik Kim
(74) *Attorney, Agent, or Firm*—IPLM Group, P.A.

(57) ABSTRACT

In an apparatus for the preparation of a plurality of drinks from cartridges that are provided with an optical code on one of its faces identifying the cartridge itself and the corresponding drink, the reading of the optical code is made more certain and reliable thanks to a stretching member that extends the portion of the face of the cartridge containing the optical code, so as to deform it into a predetermined position, facing the reading window.

33 Claims, 4 Drawing Sheets

APPARATUS WITH CARTRIDGES FOR THE PREPARATION OF DRINKS, WITH ACTIVATION FOLLOWING THE READING OF AN OPTICAL CODE CARRIED BY THE CARTRIDGE

FIELD OF THE INVENTION

The present invention refers to an apparatus for the preparation of a plurality of drinks, at the choice of a user, from cartridges (also known as pods) specific to each drink and inserted by the user into the apparatus, in particular of the type in which a cartridge carries an optical code on one of its faces identifying the cartridge itself and the corresponding drink.

BACKGROUND OF THE INVENTION

Automatic machines for the preparation of drinks are known, in which single-dose or single-use cartridges are used, containing the ingredients of the drink. To prepare a drink, a cartridge corresponding to the desired drink is inserted by the user into a cartridge path that comprises a brewing chamber, where the apparatus automatically provides for preparing the drink by making water pass through the cartridge itself. Apparatuses of this type are known and widespread above all for the preparation of hot drinks, such as coffee, tea, chocolate and the like, but sometimes the preparation of cold drinks is also provided, such as typically flat soft drinks.

The drink is obtained either by infusion of the ingredients of the cartridge into the brewing water (typical method for coffee and tea) or by dissolving of the ingredients themselves into the water (typical method for cold drinks and for some hot drinks). According to the case, the brewing water is therefore previously heated or cooled to the temperature suitable for the preparation of the specific drink.

The drink thus produced is conveyed towards a dispenser, below which a suitable container, such as a plastic cup or a jug, has previously been arranged.

The cartridges can comprise a casing made from filtrating material containing the ingredients for the drink, or else can be made from a material impermeable to air and water with a plastic body in which the ingredients for the drink are sealed by a deformable laminate sheet: in this case the brewing water is made to pass inside the cartridge after perforation of the cartridge itself at a predetermined entry point for the water and at a predetermined exit point for the drink.

According to the level of automation of the apparatus, some functions can be carried out automatically, such as the determination of amount, temperature, and possible pressure of the water, the movement of the cartridge in its path, the choice of the type of cup and its arrangement in position, the possible dispensing of sweetener and the selection thereof, the possible dispensing of a spoon and the possible dispensing of further additional products such as milk, cream, chocolate powder, etc.

To be possible to automate the preparation cycle of the drink, it is necessary for the apparatus to know what drink must be prepared from the many for which it is normally set. For such a purpose apparatuses are known that use optical readers that read codes arranged on the cartridges and that communicate the reading to a control unit of the apparatus; the control unit can thus recognise what drink must be prepared with the cartridge that has been inserted and consequently can activate the specific preparation cycle for such a drink.

Even if the preparation cycle of the drink is the same for all types of drink, the reading of the code can provide useful information to the control unit, such as the expiry date of the ingredients contained in the cartridge, the compatibility of the type of cartridge with the apparatus, etc.

By optical code we mean to indicate a group of graphical symbols through which a piece of information is coded as a sequence of white zones and black zones or else variously coloured zones, arranged according to one or more directions. Examples of such codes are barcodes, stacked codes, two-dimensional codes, colour codes and others. By optical code we also mean a string of alphanumeric characters, stamps, logos, signatures or other symbols having the function of coding information.

In general, an optical reader comprises on one side a light source and an optical illumination or scanning path that extends from the light source towards the code, and on the other side an optical sensor and an optical image formation system, arranged in an optical image reception path that extends from the code to the optical sensor; all of this is arranged in a suitable housing, provided with at least one window, through which preferably pass both the optical illumination path and the optical image reception path, i.e. both the light that goes from the light source to illuminate the code and the light that goes towards the sensor from the illuminated code. The optical image formation system is a group of optical components (such as, typically, mirrors, lenses and possibly also diaphragms) for collecting and focusing the image of the code on the sensor.

The optical code reader can be of the type comprising one or more LEDs as the light source and an optical illumination system for illuminating the optical code, and the optical sensor can be of the charge coupling device (CCD) type or of the complementary metal-oxide semiconductor (C-MOS) type for receiving the light signal coming from the code and transforming it into an electrical signal. Both types of sensor, moreover, can be of the linear or two-dimensional type. Alternatively, the reader can be of the type comprising a laser diode as the light source, an optical illumination system and scanning means for generating a scan and, therefore, illuminating the optical code, and the image sensor can comprise one or more photodiodes for receiving the light signal coming from the code and transforming it into an electrical signal. For both types of reader, the electrical signal representing the content of the code can be processed and decoded by a suitable processing system contained in the reader itself or separate from the reader, but connected to it through an electrical or radio connection.

U.S. Pat. No. 6,117,471 (King) describes a machine for preparing drinks using disposable cartridges. The cartridges are made from filtrating material and can be contained in a corresponding impermeable bag, which can be opened by the user or automatically. The machine comprises automatic positioning means of the cartridge in a brewing chamber, starting from a loading position, through a corresponding guide. The cartridge can be provided with an optical code that is read by a suitable reader when it is moved along the guide, before its insertion inside the brewing chamber. The optical code contains information that the reader sends to a controller of the machine: this information can, for example, communicate to the controller whether the cartridge can be accepted by the machine, whether the ingredients contained in the cartridge are fresh, or other information linked to the cartridge and to the material contained in it.

WO 01/58786 (Kraft) describes a cartridge structure containing ingredients for drinks (to be made through brewing), made from material impermeable to air and water, comprising a liquid entry point and a drink exit point. The cartridge comprises a shaped tank made from plastic hermetically sealed in the open part by a laminate sheet. The cartridge is provided with recognition means that allow the machine to set the correct preparation cycle of the drink. The recognition means can be an optical code printed on the lower side of the cartridge made from laminate sheet.

EP 334,573 (General Foods) describes a machine for making drinks using disposable cartridges. This document is cited in document WO 01/58786 in which it is stated that the machine of EP 334,573 can be modified, associating it with an optical reader used to read codes printed on the cartridges. This patent describes a piece of equipment with extremely complicated kinematisms, which receives a cartridge in a brewing chamber, "gripping it" between two substantially parallel plates. When the cartridge is positioned between the two plates, the entry and exit points are perforated by corresponding means.

U.S. Pat. No. 4,858,523 (Helbling) describes a machine for preparing drinks. The machine is loaded with filtrating cartridges containing the ingredients for the drink, and comprises a microprocessor for controlling the preparation cycles of the drinks. Amongst the inputs that the microprocessor receives there is the one sent by an optical reader for barcodes printed on the casing of the cartridge, which communicates to the microprocessor the type of drink contained in the cartridge itself, determining its preparation cycle.

EP 1,163,869 (Fianara) illustrates a machine in which a (substantially frusto-conical) cartridge is inserted into a brewing chamber and held in its seat by corresponding locking means. The cartridge is perforated by suitable elements allowing the entry of the liquid and the exit of the drink.

EP 272,922 (General Foods) describes variously shaped cartridges comprising a plastic body sealed by a laminate sheet.

The problem forming the basis of the present invention is that of making the reading of an optical code provided on the cartridge more certain, more reliable and more repeatable.

BRIEF SUMMARY OF THE INVENTION

Such a problem is solved by the apparatus of the present invention.

In particular, in accordance with the invention, an apparatus is provided for preparing a plurality of drinks at the choice of a user from specific cartridges for each drink that are inserted by the user into the apparatus, in particular of the type in which a cartridge is provided with an optical code on a portion of one of its faces identifying the cartridge itself and the corresponding drink, said apparatus comprising:

- a cartridge path, extending between an insertion mouth for a new cartridge and a discharge mouth for a used cartridge,
- a reading station of the optical code of the inserted cartridge, such a reading station being arranged in the cartridge path,
- a reading window facing the reading station,
- a reader acting on the reading station through the reading window, for reading the code of the cartridge in the reading station,
- a controller, connected to said reader, for the activation of an operating cycle for the preparation of the drink corresponding to the cartridge, and
- a positioning arrangement of the cartridge in the reading station, wherein said positioning arrangement comprises:
  an abutment plane,
  at least one stretching member of at least one portion of the face of the cartridge containing the optical code, said stretching member projecting with respect to the abutment plane,
  said positioning arrangement of the cartridge being such as to press the cartridge on the abutment plane, with the optical code arranged facing the reading window and with said at least one stretching member acting upon the face of the cartridge, to deform the face portion of the cartridge containing the code, laying it in a substantially uniform manner and arranging it in a predetermined position, facing said reading window.

The fact that the portion of the face of the cartridge containing the code is extended and stretched, arranged in a predetermined position, ensures that the optical code provided on such a face is readable in a way that is much easier, much more reliable and easier to repeat.

Problems deriving from the irregular reflections generated by the code when they are printed on a non-uniform (even extremely non-uniform) or creased surface are thus totally eliminated, or at least minimised.

Indeed, light is reflected according to different and unpredictable angles and positions: in these conditions, the phenomenon of reflection overlaps with the phenomenon of diffusion, and the reader, which is typically suitable for detecting the light diffused by the code (and not the reflected light) to avoid problems linked to the blinding of the sensor, is unable to discriminate the light diffused by the zones of the code with different reflectivity, making it very difficult, if not impossible, to decode the illuminated code.

The apparatus according to the invention therefore allows to solve the problems relative to the distortion of the code due to deformation of the portion of cartridge on which it is printed, as well as difficulty of illumination of the code, production of uncontrolled reflections between the reading window and the code and difficulty in focusing. Indeed, thanks to the invention, the optical code is always arranged on a regular and uniform surface, in the same predetermined arrangement provided for reading, exactly facing (in contact or spaced) the reading window; moreover, the face portion of the cartridge on which the optical code is situated is perfectly extended, without undulations, folds or creases.

Also, in the case in which the cartridge is subjected to a sterilisation and/or pasteurisation process (necessary for some ingredients that can be contained in the cartridge, such as milk or cream), the face portion on which the code is printed is even more creased and irregular, making the solution according to the invention even more advantageous for the correct operation of the apparatus.

The lying down and positioning of the code on a predetermined zone, facing (in contact or spaced) the reading window, can be obtained in different ways.

In a first preferred embodiment of the invention, the stretching member is formed from the same reading window, suitably shaped.

In such a case, the reading window, in a first embodiment thereof, is flat and arranged according to a plane that is tilted with respect to the abutment plane by a predetermined angle, preferably between 0 and 30°. In a second embodiment thereof, the reading window is flat and arranged according to a reading plane parallel to the abutment plane and raised with respect to it. In a third embodiment thereof, the reading window is convex. In further embodiments, the reading window can have a combination of the aforementioned characteristics, for example it can be raised and tilted with respect to the abutment plane, or else convex and tilted, etc. The choice amongst these embodiments of the reading window can be made according to the conditions of movement of the cartridge in the path inside the apparatus and of resistance to stresses of the material in which the face of the cartridge containing the code is made: indeed, an excessive projection of the reading window could cause the breaking of the face of the cartridge, making it unusable.

Therefore, compatibly with the resistance of the face of the cartridge, the reading window can project more or less from the abutment plane. Consequently, if the reading window has a large extension, its inclination must be contained in order to avoid it projecting too much, whereas, vice-versa, if the reading window should have a short extension, then its inclination can be greater, given that its projection would be more limited.

Of course, the extension of the reading window depends upon the reading technology used and the code to be decoded: in the case, for example, of a linear code and laser reading technology, the reading window is preferably narrow in the direction perpendicular to the reading direction and long in the reading direction, whereas in the case of a two-dimensional code and CCD reading technology, the reading window preferably has a wide extension according to the two perpendicular reading directions.

The reading window can be open, but preferably it is closed by a panel (made from transparent material or with a predetermined degree of opaqueness to obtain a diffusing effect, for example from glass or plastic), so as to obtain an optimal extension of the code on the entire extension of the window. Moreover, the panel allows the reader to be kept protected with respect to the path of the cartridge; in such a path, indeed, relatively high temperatures can develop, sprays of liquid can occur and dirt can be deposited. Finally, the structure of the reading window (raised and tilted) allows the window to clean itself: possible drops of drink that might be deposited on it, potentially harmful for a correct reading of the code, would slide downwards, freeing the field of view of the optical reader.

Advantageously, the reading window can have rounded edges and/or corners so as to avoid the face of the cartridge from being able to be perforated during the reading step of the code.

In another preferred embodiment of the invention, the stretching member is formed from at least one shaped appendix, advantageously placed near to the reading window. The shaped appendix is such as to apply a stress on the face of the cartridge so that, when the positioning arrangement thrusts the cartridge against the abutment plane, the code is extended uniformly and is arranged on a predetermined plane.

Also in this case, the shape and size of the shaped appendix depend upon the resistance to stresses of the material with which the face of the cartridge containing the code is made.

Generally, the stretching member must be of a size and geometry such as to allow the optimal extension of the code and such as to never perforate the cartridge.

Preferably, the reader is active to read the optical code on the cartridge in the reading station only when the positioning arrangement presses the cartridge against the stretching member.

The positioning arrangement can be made in various ways. For example and preferably, the positioning arrangement comprises a thruster, acting on the cartridge to press it against the stretching member.

The thruster, which can be mobile or fixed, is able to act upon the cartridge so as to force the portion of face on which the code is printed against the stretching member, so that the code extends facing the reading window.

The path of the cartridge comprises a drink preparation and dispensing station, which can be distinct or coincident with the reading station; when the two stations are coincident, the positioning arrangement in the reading station is suitable for holding the cartridge in position during the preparation and dispensing of the drink. This arrangement ensures that the information read is actually that provided on the cartridge with which one is about to prepare the drink, also in the case of errors in movement of the cartridge in its path.

Preferably, the optical code can be a linear, two-dimensional or colour barcode, and the reader can comprise a corresponding code reader.

BRIEF DESCRIPTION OF THE DRAWINGS

Further characteristics and advantages of an apparatus according to the invention shall become clearer from the following description of some preferred embodiments thereof, given with reference to the attached drawings. In such drawings.

DETAILED DESCRIPTION OF THE INVENTION

In the figures, an apparatus for the preparation of a plurality of drinks from cartridges K, containing the specific ingredients for the preparation of each drink, is wholly indicated with 10. The cartridges K are of a known type, such as those illustrated in the various documents previously cited.

Usually, a cartridge K is single-dose and single-use, i.e. is intended for the preparation of just one serving of drink after which it is disposed of, together with the possible remains of the product used for the preparation of the drink; nevertheless, it is also possible for the cartridge K to be reusable, and/or for it to be able to be used for the preparation of two or more servings of drink.

Each cartridge K is provided on one of its faces F with an optical code C with information on the drink that the cartridge K itself is intended to prepare; the face F can be more or less flexible and deformable, made for example from a sheet of laminate metal material. The optical code can be one of the numerous types known; preferably it is a barcode.

Figure 1:
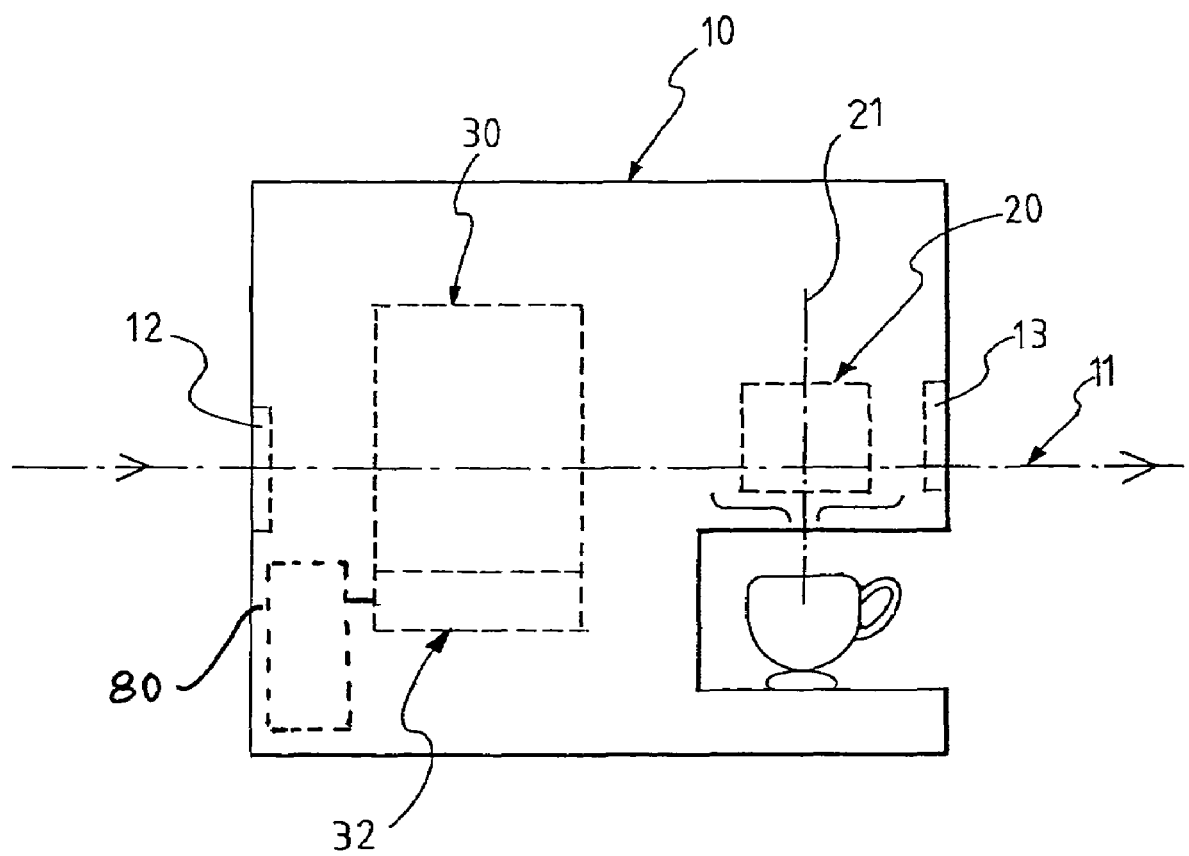
FIG. 1 is a schematic view of an apparatus in accordance with the invention, for the preparation of a plurality of drinks from cartridges.

In the apparatus 10 a cartridge path is provided, schematically indicated with reference numeral 11 in FIG. 1, for the cartridge K, extending between an insertion mouth 12 for the new cartridge K and an exit mouth 13 for the used cartridge K. In the cartridge path 11 a drink preparation and dispensing station 20 is provided (also known as brewing station, because the preparation of the drink usually indeed occurs by brewing), in which the cartridge K is positioned so as to intercept a water delivery path, schematically indicated with reference numeral 21. The water crosses the cartridge K and produces (with the ingredients present in the cartridge, by percolation or by dissolving) the desired drink, which is dispensed from the spout 22.

According to the structure of the apparatus 10, the cartridge path 11 can have different configurations, more or less complex. In a particularly simple configuration, the path 11 can at the extreme comprise just the dispensing station 20 and a single mouth that acts both as an insertion mouth 12 and as an exit mouth 13.

Along the cartridge path 11 a reading station 30 of the optical code C provided on the cartridge K is provided. Facing the reading station 30, there is a reading window 40, through which reader (for example a barcode reader, schematically indicated in the figures with 32) is active on the reading station 30; such reader 32 is operatively connected to a controller, generally indicated by 80, for activation of an operating cycle for the preparation of a drink corresponding to the cartridge K. The reading station 30 is inserted into any point of the cartridge path 11, in particular it can, for example, coincide with the drink preparation and dispensing station 20.

Figure 2:
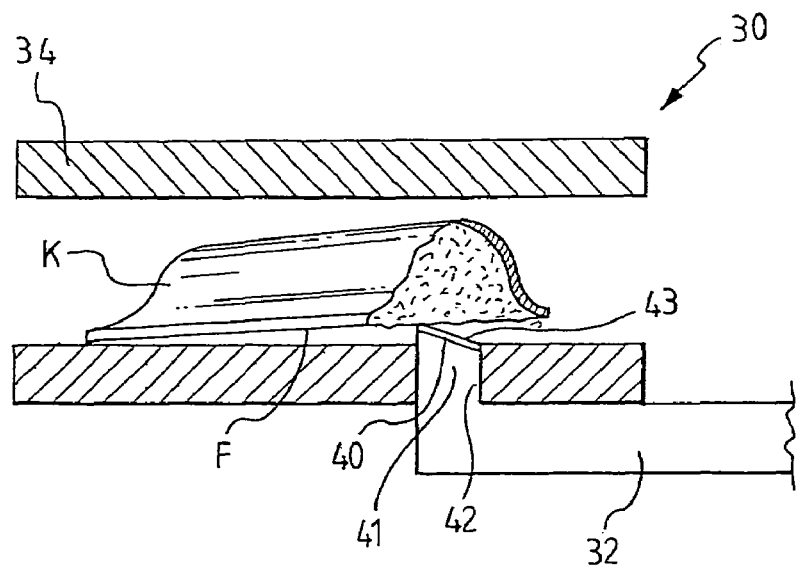
FIGS. 2 and 3 are schematic views of the reading station of the apparatus of FIG. 1, in a first embodiment, in two operating positions and with a cartridge inserted.
Figure 3:
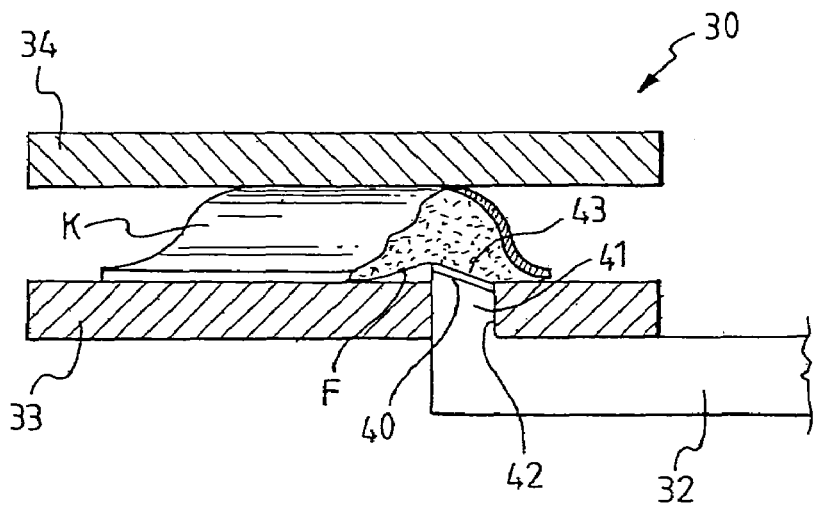
Figure 4:
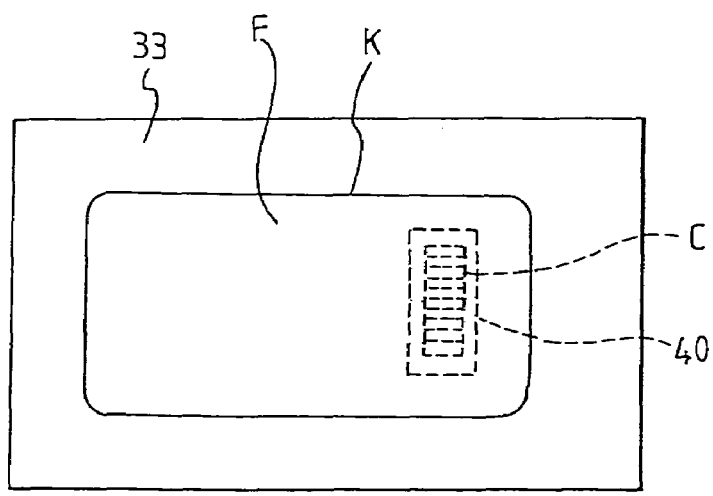
FIG. 4 is a schematic plan view of the reading station of FIGS. 2 and 3.

In the reading station 30 a positioning arrangement of the cartridge K in the station 30 itself is provided. Such arrangement comprises, for example, an abutment plane 33 and a thruster 34 opposite the abutment plane 33; preferably, at least one of the two elements 33 and 34 is mobile in the apparatus 10, so that the thruster 34 and the abutment plane 33 define an open position (FIG. 2), in which they are sufficiently spaced apart so as to allow the cartridge K to pass between them, allowing it to move in its path 11, and a closed position (FIG. 3) in which they are thrusted towards each other so as to lock the cartridge K between them.

The abutment plane 33 and the thruster 34 can also be fixed together, provided that they define an air space in which a cartridge K can be inserted (for example through a corresponding insertion guide) and inside which the portion of face F of the cartridge K on which the code C is printed is pressed on the abutment plane 33, as described better later on.

In accordance with the invention, the positioning arrangement 33, 34 of the cartridge K in the reading station 30 is such as to press the face F of the cartridge K against a stretching member, provided in the reading station 30, with sufficient force to deform the portion of the face F of the cartridge K on which the code C is printed, extending it and positioning it in a predetermined way with the code C facing the reading window 40, but not such as to risk the accidental perforation of the face F.

In a first embodiment of the invention, illustrated in FIGS. 2 to 7, the stretching member is the reading window 40 itself, made projecting from the abutment plane 33.

The reading window 40 comprises a space 41, surrounded by a perimetric wall 42 and preferably closed towards the reading station 30 by a panel 43, sealed on the perimetric wall 42, through which the reading of the code C by the reader 32 takes place. The panel 43 is made from transparent material or material with a predetermined degree of opaqueness to allow a diffusing effect, for example from glass or plastic. In a simplified variant, not illustrated, the reading window 40 can be simply open, without any closing panel; such a variant, obviously, can only be adopted in cases in which (due to the mutual positions of the various elements) there is no risk of dirtying the reader 32 and the code C is printed on an easily deformable surface.

Figure 5:
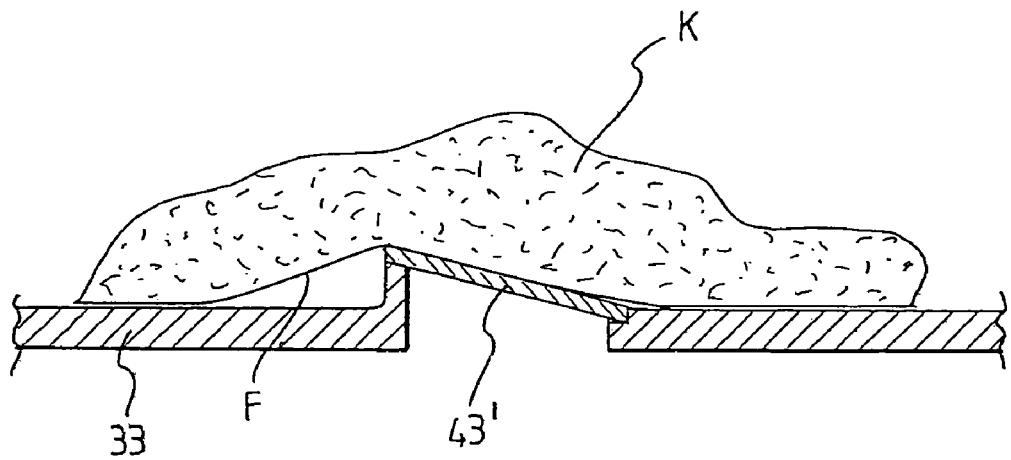
FIGS. 5 to 7 are detailed schematic views of three different variants of the reading window of the reading station of FIGS. 2 to 4.
Figure 6:
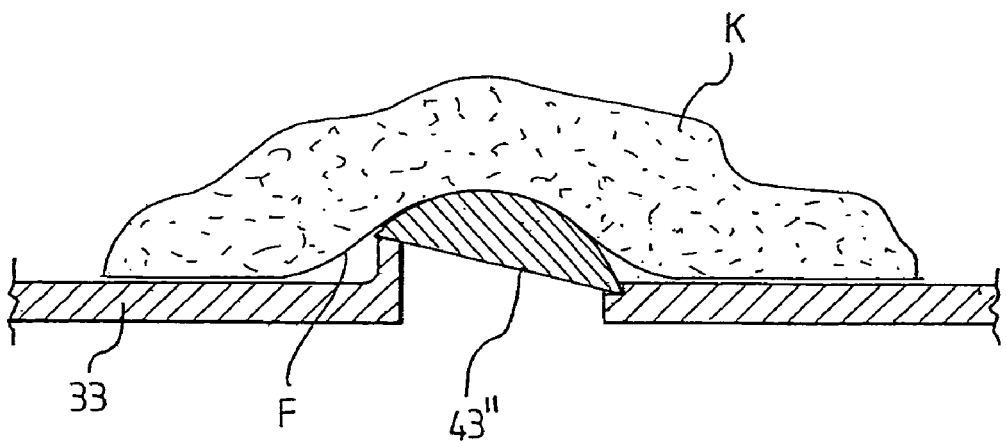
Figure 7:
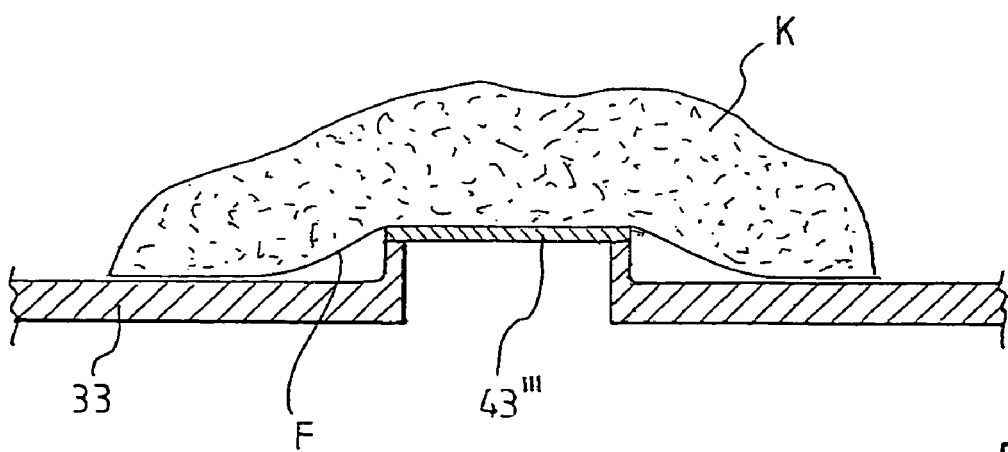

The reading window 40 can have different configurations, as illustrated in FIGS. 5, 6 and 7.

In particular, the reading window can be flat, tilted with respect to the abutment plane 33 by a predetermined angle, like the window 40' of FIG. 5. The aforementioned predetermined angle is preferably between 0 and 30°, but it can also take different values provided that they are compatible with the resistance of the material with which the face F of the cartridge K containing the code C is made.

Compatibly with the resistance and the extension of the face F of the cartridge K, the reading window 40 can project more or less from the abutment plane 33. Consequently, if the reading window 40 has a long extension, its inclination must be low so as to avoid it projecting too much and thus to avoid it being able to damage the cartridge, whereas, vice-versa, if the reading window has a short extension, then its inclination can be greater, given that its projection is shorter.

Alternatively, the reading window can be convex, like the window 40" of FIG. 6; with this expression we intend to indicate that the window 40" is closed by a convex panel 43". It should be noted that the illustrated transparent panel 43" is tilted with respect to the abutment plane 33, but it could also be parallel to it.

Again alternatively, the reading window can be flat, parallel and spaced with respect to the abutment plane 33 by a predetermined distance, closed by a panel 43''', like the window 40''' of FIG. 7.

In a further embodiment, not illustrated, the reading window 40 can be raised and tilted with respect to the abutment plane 33.

Of course, the embodiments described above of the reading window 40 can also be combined together.

As stated, the choice amongst these embodiments of the reading window can be made according to the conditions of movement of the cartridge K in the path inside the apparatus and of resistance to stresses of the material with which the face F of the cartridge K containing the code C is made.

Advantageously the edges and/or the corners of the reading window 40 can be rounded so as to avoid them damaging the cartridge K.

Figure 8:
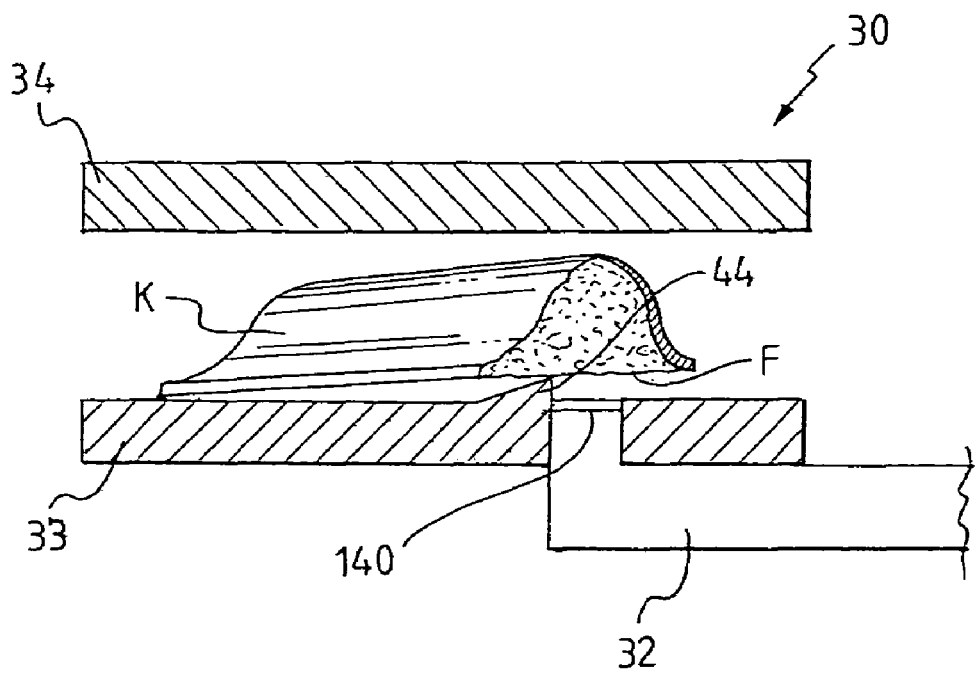
FIGS. 8 and 9 are schematic views of the reading station of the apparatus of FIG. 1, in a second embodiment, in two operating positions and with a cartridge inserted.
Figure 9:
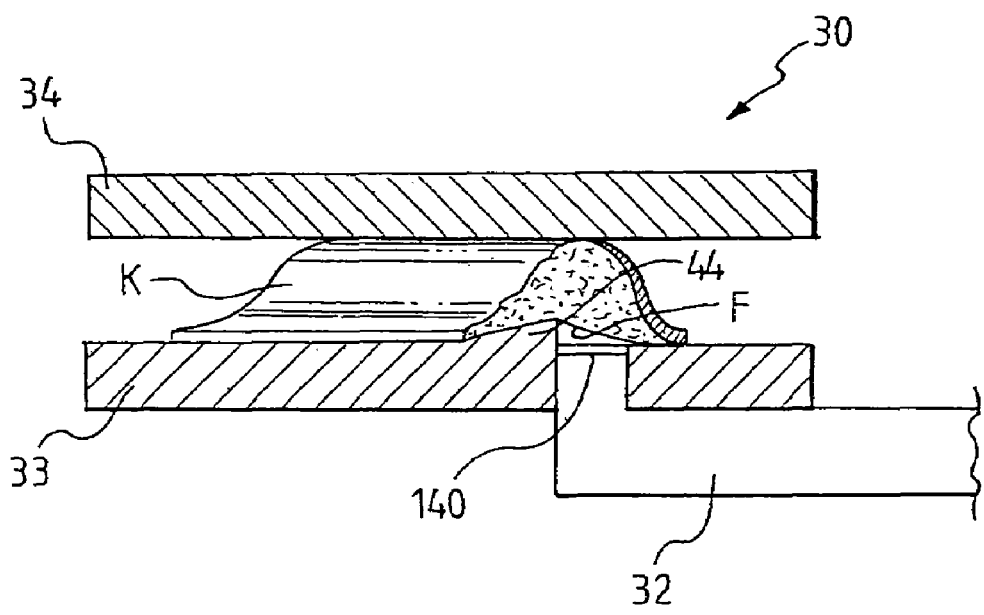

In another preferred embodiment of the invention illustrated in FIGS. 8 and 9, the stretching member is a shaped appendix 44 that extends near to the reading window, indicated in this case with 140.

It should be noted that, in this case, the reading window 140 is arranged on a plane substantially coinciding with the abutment plane 33.

The shaped appendix 44 is such as to apply a stress onto the face F of the cartridge K so that, when the positioning arrangement 33, 34 thrusts the cartridge K against the abutment plane 33, the portion of face F containing the code C is extended uniformly and is arranged on a predetermined surface, with the code C facing the reading window 140.

Also in this case, the shape and size of the shaped appendix depend upon the resistance to stresses of the material with which the face F of the cartridge K containing the code C is made.

Generally, the stretching member, 40 or 44, must be of a size and geometry such as to allow the optimal extension of the portion of the face F of the cartridge containing the code C on a predetermined surface, without ever causing the accidental perforation of the cartridge K.

Finally, the cartridge K can be either of the type with a filtrating casing or of the type with an impermeable casing; in the second case, the opening of the cartridge K can be carried out by the user, at the moment of its insertion into the apparatus 10, or else can be carried out automatically by the apparatus 10 itself (for example through cutting or perforation of the impermeable casing).

In the operation of the apparatus 10, the tension to which the face F is subjected ensures that the face F itself is extended and positioned on a predetermined surface facing the reading window 40 or 140, so that in the zone where the reading of the code C must take place possible folds, creases and the like are avoided, even if the cartridge K has a flexible casing. In the case in which the stretching member is the reading window 40 itself, the panel 43 (43', 43", 43''') defines a regular surface on which the code C extends uniformly and in a predetermined position, ensuring that the reflected light does not blind the sensor, and, consequently, allowing the reader to correctly discriminate between the light diffused by zones with different reflectivity of the code. Moreover, should the code C to be read be arranged on the reading window 40, the risks of undesired reflection shall be reduced to the minimum, even in the presence of the transparent panel 43 for protecting the reader 32.

In any case, the stretching member allows an extremely precise positioning of the code C given by the tension of the face F eliminating any problems of focusing and allowing even readers with limited depth of focus to be used, therefore, economically very advantageous.

Therefore, basically, the reading of the code C is made easier, much more reliable and repeatable. Consequently, the operation of the apparatus is equally more reliable.

The invention claimed is:

1. Apparatus for the preparation of a plurality of drinks at the choice of a user from cartridges specific to each drink that are inserted by the user in the apparatus, in particular of the type in which a cartridge having at least one face is provided with an optical code on one of said at least one face identifying the cartridge and the corresponding drink, said apparatus comprising:
  a cartridge path, extending between an insertion mouth for a new cartridge and a discharge mouth for a used cartridge,
  a reading station of the optical code of the inserted cartridge, said reading station being arranged in the cartridge path,
  a reading window facing the reading station,
  a reader acting on the reading station through the reading window, for reading the code of the cartridge in the reading station,
  a controller, connected to said reader, for the activation of an operating cycle for the preparation of the drink corresponding to the cartridge, and
  a positioning arrangement of the cartridge in the reading station, wherein said positioning arrangement comprises:
    an abutment plane,
    at least one stretching member of at least one portion of the face of the cartridge containing the optical code, said stretching member projecting with respect to the abutment plane,
    said positioning arrangement of the cartridge configured to press the cartridge on the abutment plane, with the optical code arranged facing the reading window and with said at least one stretching member acting with a thrust on the face of the cartridge, to deform the portion of face of the cartridge containing the code, extending the portion of face of the cartridge substantially uniformly and arranging the portion of face of the cartridge in a predetermined position, facing said reading window.

2. Apparatus according to claim 1, wherein said at least one stretching member is the reading window, said optical code being suitable for being arranged facing the reading window in contact with the reading window.

3. Apparatus according to claim 2, wherein the reading window is flat and arranged according to a reading plane tilted by a predetermined angle with respect to the abutment plane.

4. Apparatus according to claim 3, where in the predetermined angle is between 0 and 30°.

5. Apparatus according to claim 2, wherein the reading window is flat and arranged according to a reading plane parallel to the abutment plane and raised with respect to the abutment plane.

6. Apparatus according to claim 2, wherein the reading window is convex.

7. Apparatus according to claim 1, wherein the reading window is closed by a panel made from transparent material.

8. Apparatus according to claim 1, wherein the reading window is closed by a panel made from a material with a predetermined degree of opaqueness to obtain a diffusing effect.

9. Apparatus according to claim 1, wherein the reading window is open.

10. Apparatus according to claim 2, wherein said reading window has smooth edges.

11. Apparatus according to claim 1, wherein said at least one stretching member comprises at least one shaped appendix that extends from said abutment plane.

12. Apparatus according to claim 11, wherein said at least one shaped appendix extends from said abutment plane near to the perimetric zone of said reading window.

13. Apparatus according to claim 1, wherein the positioning arrangement comprises a thruster, acting on the cartridge so that the thruster presses the cartridge against said at least one stretching member.

14. Apparatus according to claim 13, wherein said thruster and said abutment plane are mutually mobile between an open position, in which said thruster and said abutment plane are sufficiently spaced apart as to allow the cartridge to pass between the thruster and the abutment plane, and a closed position, in which said thruster thrusts towards the abutment plane so as to lock the cartridge between the thruster and the abutment plane.

15. Apparatus according to claim 13, wherein said thruster and said abutment plane are fixed together, defining an air space in which a cartridge can be inserted and inside of which the portion of face of the cartridge with the optical code is pressed on said at least one stretching member.

16. Apparatus according to claim 1, wherein the reader is active to read the optical code on the cartridge in the reading station only when the positioning arrangement presses the face of the cartridge with the optical code against said at least one stretching member.

17. Apparatus according to claim 1, wherein the cartridge path comprises a drink preparation and dispensing station coinciding with the reading station, and wherein the positioning arrangement in the reading station is suitable for holding the cartridge in position during the preparation and dispensing of the drink.

18. Apparatus according to claim1, wherein the optical code is a barcode and the reader comprises a barcode reader.

19. Apparatus for the preparation of a plurality of drinks at the choice of a user from cartridges specific to each drink that are inserted by the user in the apparatus, in particular of the type in which a cartridge having at least one face is provided with an optical code on the at least one face identifying the cartridge and the corresponding drink, said apparatus comprising:
  a cartridge path, extending between an insertion mouth for a new cartridge and a discharge mouth for a used cartridge,
  a reading station of the optical code of the inserted cartridge, such a reading station being arranged in the cartridge path, a reading window facing the reading station, a reader acting on the reading station through the reading window, for reading the code of the cartridge in the reading station, a controller, connected to said reader, for the activation of an operating cycle for the preparation of the drink corresponding to the cartridge, and a positioning arrangement of the cartridge in the reading station comprising an abutment plane against which the cartridge rests, wherein said reading window projects from the abutment plane in the reading station.

20. Apparatus according to claim 19, wherein the reading window is flat and arranged according to a reading plane tilted by a predetermined angle with respect to the abutment plane.

21. Apparatus according to claim 20, where in the predetermined angle is between 0 and 30°.

22. Apparatus according to claim 20, wherein the reading window is flat and arranged according to a reading plane parallel to the abutment plane and raised with respect to the abutment plane.

23. Apparatus according to claim 20, wherein the reading window is convex.

24. Apparatus according to claim 19, wherein the reading window is closed by a panel made from transparent material.

25. Apparatus according to claim 19, wherein the reading window is closed by a panel made from a material with a predetermined degree of opaqueness to obtain a diffusing effect.

26. Apparatus according to claim 19, wherein the reading window is open.

27. Apparatus according to claim 20, wherein said reading window has smooth edges.

28. Apparatus according to claim 19, wherein the positioning arrangement comprises a thruster, acting on the cartridge so that the thruster presses the cartridge against said reading window.

29. Apparatus according to claim 28, wherein said thruster and said abutment plane are mutually mobile between an open position, in which said thruster and said abutment plane are sufficiently spaced apart as to allow the cartridge to pass between the thruster and the abutment plane, and a closed position, in which said thruster thrusts towards the abutment plane so as to lock the cartridge between the thruster and abutment plane.

30. Apparatus according to claim 28, wherein said thruster and said abutment plane are fixed together, defining an air space in which a cartridge can be inserted and inside of which the portion of face of the cartridge with the optical code is pressed on said reading window.

31. Apparatus according to claim 19, wherein the reader is active to read the optical code on the cartridge in the reading station only when the positioning arrangement presses the face of the cartridge with the optical code against said reading window.

32. Apparatus according to claim 19, wherein the cartridge path comprises a drink preparation and dispensing station coinciding with the reading station, and wherein the positioning arrangement in the reading station is suitable for holding the cartridge in position during the preparation and dispensing of the drink.

33. Apparatus according to claim 19, wherein the optical code is a barcode and the reader comprises a barcode reader.

* * * * *